United States Patent
Beele

(10) Patent No.: US 9,528,636 B2
(45) Date of Patent: *Dec. 27, 2016

(54) SYSTEM FOR DYNAMICALLY SEALING A CONDUIT SLEEVE THROUGH WHICH A PIPE OR CABLE EXTENDS

(75) Inventor: Johannes Alfred Beele, Aalten (NL)

(73) Assignee: Beele Engineering B.V., Aalten (NL)

( * ) Notice: Subject to any disclaimer, the term of this patent is extended or adjusted under 35 U.S.C. 154(b) by 739 days.

This patent is subject to a terminal disclaimer.

(21) Appl. No.: 12/225,346

(22) PCT Filed: Mar. 20, 2007

(86) PCT No.: PCT/EP2007/002478
§ 371 (c)(1),
(2), (4) Date: Oct. 6, 2010

(87) PCT Pub. No.: WO2007/107342
PCT Pub. Date: Sep. 27, 2007

(65) Prior Publication Data
US 2011/0018210 A1    Jan. 27, 2011

(30) Foreign Application Priority Data
Mar. 20, 2006   (EP) .................................... 06005629

(51) Int. Cl.
*F16L 5/02*   (2006.01)
*F16L 5/10*   (2006.01)

(52) U.S. Cl.
CPC ........................................ *F16L 5/10* (2013.01)

(58) Field of Classification Search
USPC ........................................ 277/606, 607, 644
See application file for complete search history.

(56) References Cited

U.S. PATENT DOCUMENTS 2,032,492 A * 3/1936 Nathan .......................... 277/615
2,202,617 A    5/1940 Bishop
(Continued)

FOREIGN PATENT DOCUMENTS

CA     2 325 183       5/2001
CN     1147294 A       4/1997
(Continued)

OTHER PUBLICATIONS

U.S. Appl. No. 12/310,375, filed Feb. 23, 2009, Beele.
(Continued)

*Primary Examiner* — Eugene G Byrd
(74) *Attorney, Agent, or Firm* — Wolf, Greenfield & Sacks, P.C.

(57) ABSTRACT

A system for dynamically sealing an opening through which at least one pipe, cable or duct extends via a conduit sleeve which is fittingly and sealingly fixed to the circumference of the opening or which corresponds to the opening. The system comprises at least an elastically deformable plug which is fittingly and sealingly insertable in the conduit sleeve. The plug has two ends, an outer side and an inner side. Each end has dimensions that allow for fitting of that end in the conduit sleeve. The outer side comprises a number of outer ribs having tops spaced apart in a longitudinal direction of the plug for realizing annular contact surfaces between the plug and an inner circumferential wall of the conduit sleeve. The inner side comprises a number of inner ribs having tops spaced apart in the longitudinal direction of the plug for realizing annular contact surfaces between the plug and the at least one pipe, cable or duct. The inner side and/or the outer side is provided with at least one hingeable surface area for facilitating compression of the plug in the longitudinal direction and a transverse movement of at least one of the inner or outer ribs.

33 Claims, 9 Drawing Sheets

(56) References Cited

U.S. PATENT DOCUMENTS

| | | | |
|---|---|---|---|
| 2,271,777 A * | 2/1942 | Nathan | 277/615 |
| 2,354,919 A | 8/1944 | Elmer | |
| 2,355,742 A | 8/1944 | Morehouse | |
| 2,396,836 A | 3/1946 | Ellinwood | |
| 2,404,531 A | 7/1946 | Robertson | |
| 2,448,769 A * | 9/1948 | Chamberlain | 285/231 |
| 2,819,099 A * | 1/1958 | Rittle | 277/626 |
| 2,896,974 A | 7/1959 | Bush | |
| 3,016,722 A | 1/1962 | Batdorf | |
| 3,048,415 A * | 8/1962 | Shook | 277/615 |
| 3,067,425 A | 12/1962 | Colley | |
| 3,162,412 A | 12/1964 | McEntire | |
| 3,163,448 A | 12/1964 | Carl | |
| 3,165,324 A | 1/1965 | Zopfi | |
| 3,206,539 A | 9/1965 | Kelly | |
| 3,229,026 A | 1/1966 | Sulzer | |
| 3,331,914 A * | 7/1967 | Kavinsky | 174/667 |
| 3,352,212 A | 11/1967 | Read | |
| 3,489,440 A | 1/1970 | Brattberg | |
| 3,578,027 A | 5/1971 | Zopfi | |
| 3,580,988 A | 5/1971 | Orlowski et al. | |
| 3,702,193 A * | 11/1972 | Flegel et al. | 277/607 |
| 3,731,448 A | 5/1973 | Leo | |
| 3,793,672 A | 2/1974 | Wetmore | |
| 3,811,711 A * | 5/1974 | Tarkenton | 285/110 |
| 3,827,704 A * | 8/1974 | Gillemot et al. | 277/606 |
| 3,893,919 A * | 7/1975 | Flegel et al. | 210/166 |
| 3,913,928 A | 10/1975 | Yamaguchi | |
| 4,061,344 A | 12/1977 | Bradley et al. | |
| 4,075,803 A | 2/1978 | Alesi | |
| 4,086,736 A | 5/1978 | Landrigan | |
| 4,245,445 A | 1/1981 | Heinen | |
| 4,293,138 A * | 10/1981 | Swantee | 277/607 |
| 4,361,721 A | 11/1982 | Massey | |
| 4,376,230 A | 3/1983 | Bargsten | |
| 4,385,777 A | 5/1983 | Logsdon | |
| 4,413,845 A | 11/1983 | Lawrence | |
| 4,419,535 A | 12/1983 | O'Hara | |
| 4,426,095 A * | 1/1984 | Buttner | 277/606 |
| 4,429,886 A * | 2/1984 | Buttner | 277/606 |
| 4,641,858 A * | 2/1987 | Roux | 277/615 |
| 4,664,421 A | 5/1987 | Jones | |
| 4,797,122 A | 1/1989 | Kuboi et al. | |
| 4,889,298 A | 12/1989 | Hauff | |
| 4,915,422 A | 4/1990 | Chacon et al. | |
| 4,998,896 A | 3/1991 | Lundergan | |
| 5,020,810 A | 6/1991 | Jobe | |
| 5,027,571 A | 7/1991 | Wolff | |
| 5,067,676 A | 11/1991 | Beele | |
| 5,108,060 A | 4/1992 | Beele | |
| 5,245,131 A | 9/1993 | Golden et al. | |
| 5,288,087 A | 2/1994 | Bertoldo | |
| 5,344,106 A | 9/1994 | Beele | |
| 5,377,939 A | 1/1995 | Kirma | |
| 5,456,050 A | 10/1995 | Ward | |
| 5,482,076 A | 1/1996 | Taylor et al. | |
| 5,493,068 A | 2/1996 | Klein et al. | |
| 5,611,706 A | 3/1997 | Makita et al. | |
| 5,649,712 A | 7/1997 | Ekholm | |
| 5,653,452 A * | 8/1997 | Jarvenkyla | 277/607 |
| 5,662,336 A * | 9/1997 | Hayashi et al. | 277/607 |
| 5,927,725 A * | 7/1999 | Tabata et al. | 277/607 |
| 5,954,345 A * | 9/1999 | Svoboda et al. | 277/626 |
| 6,180,882 B1 | 1/2001 | Dinh | |
| 6,259,033 B1 | 7/2001 | Kassulat | |
| 6,343,412 B1 | 2/2002 | Stephenson | |
| 6,359,224 B1 | 3/2002 | Beele | |
| 6,431,215 B1 | 8/2002 | Hsu | |
| 6,494,463 B1 | 12/2002 | Rank | |
| 6,521,840 B1 | 2/2003 | Kreutz | |
| 6,575,430 B1* | 6/2003 | Smith, III | 251/149.7 |
| 6,634,675 B2 | 10/2003 | Parkes | |
| 6,862,852 B1 | 3/2005 | Beele | |
| 6,902,138 B2 | 6/2005 | Vantouroux | |
| 6,969,799 B2 | 11/2005 | Snyder | |
| 7,005,579 B2 | 2/2006 | Beele | |
| 7,249,971 B2 | 7/2007 | Burke et al. | |
| 7,288,730 B2 | 10/2007 | Habel et al. | |
| 7,299,823 B2 | 11/2007 | Smith | |
| 7,371,969 B2 | 5/2008 | Hedstrom | |
| 7,410,174 B2 | 8/2008 | Jones et al. | |
| 7,781,684 B2 | 8/2010 | Stuckmann et al. | |
| 7,802,798 B2 * | 9/2010 | Beele | 277/607 |
| 7,806,374 B1 | 10/2010 | Ehmann et al. | |
| 7,918,486 B2 | 4/2011 | Preisendorfer | |
| 8,262,094 B2 | 9/2012 | Beele | |
| 8,490,353 B2 * | 7/2013 | Beele | 52/220.8 |
| 8,541,698 B2 | 9/2013 | Perschon et al. | |
| 8,833,014 B2 | 9/2014 | Beele | |
| 2002/0171207 A1 * | 11/2002 | Torii et al. | 277/607 |
| 2004/0045233 A1 * | 3/2004 | Beele | 52/220.8 |
| 2004/0093814 A1 | 5/2004 | Cordts et al. | |
| 2004/0093815 A1 | 5/2004 | Cordts | |
| 2004/0168398 A1 | 9/2004 | Sakno et al. | |
| 2004/0231880 A1 | 11/2004 | Beele | |
| 2005/0179214 A1 | 8/2005 | Beele | |
| 2006/0053710 A1 | 3/2006 | Miller et al. | |
| 2007/0216110 A1 | 9/2007 | Stuckmann et al. | |
| 2007/0273107 A1 | 11/2007 | Beele | |
| 2008/0088128 A1 | 4/2008 | Staskal | |
| 2009/0130891 A1 | 5/2009 | Milton | |
| 2009/0218451 A1 | 9/2009 | Lundborg | |
| 2009/0315275 A1 | 12/2009 | Beele | |
| 2010/0059941 A1* | 3/2010 | Beele | 277/606 |
| 2010/0326724 A1 | 12/2010 | Karlsson et al. | |
| 2013/0106060 A1 | 5/2013 | Beele | |
| 2013/0161913 A1 | 6/2013 | Beele | |
| 2013/0234405 A1 | 9/2013 | Beele | |
| 2015/0292649 A1 | 10/2015 | Beele | |
| 2016/0020592 A1 | 1/2016 | Beele | |

FOREIGN PATENT DOCUMENTS

| | | |
|---|---|---|
| CN | 1205068 A | 1/1999 |
| CN | 1286366 A | 3/2001 |
| CN | 1781001 A | 5/2006 |
| CN | 101506565 A | 8/2009 |
| DE | 2 203 370 | 8/1973 |
| DE | 34 43 284 A1 | 5/1986 |
| DE | 3443284 A1 | 5/1986 |
| DE | 9204067 | 3/1992 |
| DE | 92 06 312 U1 | 8/1992 |
| DE | 42 25 916 A1 | 2/1994 |
| DE | 296 05 883 U1 | 7/1996 |
| DE | 200 02 216 U1 | 4/2000 |
| DE | 20002216 U1 | 4/2000 |
| DE | 10035006 C1 | 7/2000 |
| DE | 201 03 786 U1 | 8/2001 |
| DE | 202004017185 U1 | 3/2006 |
| DE | 102005002597 B3 | 8/2006 |
| DE | 20 2006 017 659 U1 | 8/2007 |
| DE | 20 2009 004 739 U1 | 7/2009 |
| EP | 0 102 876 A2 | 3/1984 |
| EP | 0 139 337 A2 | 5/1985 |
| EP | 0 139 337 A3 | 7/1986 |
| EP | 0 278 544 A1 | 8/1988 |
| EP | 0 795 712 A1 | 9/1997 |
| EP | 0 987 482 A | 3/2000 |
| EP | 1 022 834 A1 | 7/2000 |
| EP | 1 059 695 A2 | 12/2000 |
| EP | 1 101 992 A | 5/2001 |
| EP | 1 134472 A2 | 9/2001 |
| EP | 1 617 517 A1 | 1/2006 |
| EP | PCT/EP2007/002478 | 6/2007 |
| EP | 1 837 573 A1 | 9/2007 |
| EP | PCT/EP2007/058814 | 12/2007 |
| EP | 1 892 448 A1 | 2/2008 |
| EP | PCT/EP2007/058814 | 8/2008 |
| EP | PCT/EP2010/070921 | 2/2011 |
| EP | 2 390 544 A1 | 11/2011 |
| EP | PCT/EP2010/070921 | 12/2012 |
| FR | 2 169 219 A | 9/1973 |
| FR | 2 675 879 A1 | 10/1992 |
| GB | 916 461 A | 1/1963 |

(56) References Cited

FOREIGN PATENT DOCUMENTS

| | | |
|---|---|---|
| GB | 1083451 A | 9/1967 |
| GB | 2 057 595 A | 4/1981 |
| GB | 2 171 139 A | 8/1986 |
| GB | 2 186 442 A | 8/1987 |
| GB | 2 221 736 A | 2/1990 |
| JP | 3-32272 A | 2/1991 |
| JP | H5-41868 B | 6/1993 |
| JP | H6-93372 | 4/1994 |
| JP | 07-065661 A | 3/1995 |
| JP | 07-245029 A | 9/1995 |
| JP | H7-282894 | 10/1995 |
| JP | 08-251768 A | 9/1996 |
| JP | 09-327111 A | 12/1997 |
| JP | 2006-514249 | 4/2006 |
| NL | 1 023 687 C2 | 12/2004 |
| WO | 95/27165 A1 | 10/1995 |
| WO | 98/15764 A1 | 4/1998 |
| WO | 02/43212 A1 | 5/2002 |
| WO | 02/052187 A1 | 7/2002 |
| WO | 02/070939 A1 | 9/2002 |
| WO | WO 2004/111513 | 12/2004 |
| WO | WO 2004/111513 A | 12/2004 |
| WO | 2005/006315 A1 | 1/2005 |
| WO | 2007/028443 A1 | 3/2007 |
| WO | 2007/139506 A1 | 12/2007 |
| WO | 2008/023058 A1 | 2/2008 |
| WO | 2010/086361 A2 | 8/2010 |
| WO | 2011/147490 A1 | 12/2011 |

OTHER PUBLICATIONS

International Preliminary Report on Patentability for PCT/EP2007/002478 dated Jul. 1, 2008.
International Search Report dated Apr. 19, 2013 for EP 13 15 1613 (2 pages).
U.S. Appl. No. 13/772,148, filed Feb. 20, 2013, Beele.
Written Opinion for International Application No. PCT/EP2007/002478 mailed Jun. 29, 2007.
International Search Report and Written Opinion for International Application No. PCT/EP2007/058814 mailed Dec. 4, 2007.
International Preliminary Report on Patentability for International Application No. PCT/EP2007/058814 dated Aug. 14, 2008.
International Search Report and Written Opinion for International Application No. PCT/EP2010/070921 mailed Feb. 8, 2011.
International Preliminary Report on Patentability for International Application No. PCT/EP2010/070921 mailed Dec. 6, 2012.
Office Communication dated Apr. 3, 2014 for Chinese Application No. 201080067719.7.
U.S. Appl. No. 13/794,175, filed Mar. 11, 2013, Beele.
U.S. Appl. No. 13/699,189, filed Nov. 20, 2012, Beele.
U.S. Appl. No. 14/424,306, filed Feb. 26, 2015, Beele.
U.S. Appl. No. 14/768,053, filed Aug. 14, 2015, Beele.

* cited by examiner

SYSTEM FOR DYNAMICALLY SEALING A CONDUIT SLEEVE THROUGH WHICH A PIPE OR CABLE EXTENDS

RELATED CASE INFORMATION

This application is a 371 U.S. National Stage of International Application No. PCT/EP2007/002478, filed on Mar. 20, 2007, which claims the benefit of European Application No. EP 06005629.8, filed on Mar. 20, 2006.

The invention relates to a system for sealing an opening through which at least one pipe, cable or duct extends via a conduit sleeve which is fittingly and sealingly fixed to a circumference of the opening or which corresponds to the opening.

Such an opening may comprise a tubular passage in a floor, deck, wall or partition. Another possibility is that the opening comprises a tube in which another tube is at least partly received.

Such a system is used for, for instance, two tubes having mutually different diameters connected with each other so that a fluid can flow through both tubes. One of the tubes may, for instance, form a house service connection and have a smaller diameter than a tube which forms the main line or is a branch thereof. Such tubes may be used for, for instance, transporting water, gas, oils, liquid, chemicals etc. The space located between the tubes is meant to be sealed by a system to which the invention relates.

It is also possible that cables for, for instance, telephone, electricity, and television are fed through such tubes connected with one another. Another possibility is using the system as a seal between glass fiber cables and protective tubes. Such a system may also be used for walls of buildings, in particular foundation walls and floors but also ceilings or roofs where, by means of "lost plastic tube parts", passages are left open in the poured concrete for feeding through tubes for water or gas or cables. Of course, the passage may also be provided in a concrete base with the aid of a boring method. The space between the duct and the inner wall of the "lost tube part" or the bore hole may later be sealed with a system to which the invention relates.

Further, a system to which the invention relates can be used in the construction and/or maintenance of new buildings, ships and offshore installations. Sections in such constructions are usually formed by placing prefabricated partitions according to a predetermined plan, in the case of vessels, in a dock of the shipyard. Even before the partitions are placed, feed-through tubes can be provided in the partitions, for instance with the aid of a welding method. Such a feed-through tube may be a conduit sleeve as referred to above. After the duct is fed through the feed-through tube, a system to which the invention relates can be provided for sealing a space between the inner wall of the feed-through tube and the fed-through duct. It is further possible that the feed-through tube and the duct, cable or tube fed through it are manufactured from different metal-comprising materials. This is possible because there will be no contact between the feed-through tube and the duct, cable or tube fed through it so that galvanic corrosion is at least virtually precluded. It is also possible that the duct, cable or tube fed through it are manufactured from plastic-comprising material.

The space between the inner wall of the conduit sleeve and at least one tube or duct is herein below often simply referred to as "the space".

GB 2186442 describes a transit system for cables and pipes. The system comprises a metal frame having an opening filled with lead-through blocks and blanking blocks. The lead-through blocks comprise two half-blocks which can together form a block having an opening through which a pipe, cable or duct can be fed. In other words, two halves of the lead-through blocks can surround a pipe, cable or duct. Each pipe, cable or duct is thus surrounded by at least two blocks. The remaining space in the opening is filled up with blank blocks. In this way the space between the inner wall of the conduit sleeve, in this case a metal frame, and the pipes, ducts or cables extending through the conduit sleeve or metal frame is filled up with blocks. It is possible that a stay plate is positioned between each layer of blocks. Pressure is then applied to the assembled blocks to compress the blocks around the cable, pipe or duct to seal the lead-through blocks around the cable, pipe or duct and to clamp them together and against the side walls of the frame or the conduit sleeve and to the stay plate. For this purpose, the system comprises a compression and packer system. Pressure can be applied by a system that requires tightening of nuts or compression bolts. The forces needed for compression are very high and partly passed on to the ducted pipe or cable, often non-hydrostatically. This system cannot distribute the load evenly throughout the stacking of blocks. In fact, the ducted pipe or cable will carry a part of the load and prevent an even distribution. The blocks which are much less subjected to compression "in the shade of the ducted pipe or duct" can easily be forced out. Another problem is the irreversible deformation of the rubber, which reduces the flexibility of the transit system which can be detrimental when a part of the system is suddenly exposed to a much higher pressure.

Apart from the fact that the system is difficult to install, time-consuming, costly, and requiring a large inventory control, the system further works unsatisfactorily in the long-run. Rubber, even well vulcanised rubber, has a natural relaxation occurring over time. When the rubber has not properly been saturated or vulcanised, also chemical relaxation can occur. This enhances the overall relaxation of the rubber. As a consequence of this, compression bolts or nuts of the compression and packer system of the system described in GB 2186442, needs to be retightened frequently. A further problem is that a change in temperature will due to thermal expansion or shrinkage result in loosening or over-tightening of the compression bolts, resulting in respectively weakening the sealing and irreversible deformation of the rubber.

In particular when plastic pipes or cables with plastic braidings extend through the metal frame or conduit sleeve, the outer surface of these tubes or cables is subjected to radial inward pressure and the outer diameter of these plastic pipes may decrease due to a phenomenon known as "creep". If this occurs, compression bolts and nuts of the compression and packer system should be retightened even more frequently as the integrity of the sealing provided by the compressed rubber blocks and the radially compressed plastic pipes, diminishes by both physical phenomena, creep and relaxation. However, no matter how frequently the compression bolts and/or nuts are retightened, immediately after retightening, the phenomena of relaxation of the rubber and creep of a plastic pipe will continue to occur so that the integrity of the sealing immediately further deteriorates.

Thunderhorse, the largest and most advanced semi-submersible platform in the world, was found to have a list of some 20-30 degrees after experiencing hurricane "Dennis" in the Gulf of Mexico. Although as yet no conclusive explanation for this listing has been reported, preliminary findings from the investigation indicate that water movement among the access spaces occurred through multi-cable transits which were equipped with a system similar to that GB 2186442.

Known are systems where a rubber ring is coaxially placed in a conduit sleeve around a pipe ducted through the conduit. The rubber ring is then compressed between steel ring shaped plates. Although this leads to the building up of radial forces angularly equally applied, the problems of relaxation of the rubber and, in case of plastic pipes, the problems of creep, requires frequent retightening of the compressing steel plates.

WO 2004/111513 describes a system, in more detail a plug, made of an elastically formable material for insertion in a space between an inner wall of a conduit sleeve, and a pipe, cable or duct extending through that sleeve. The plug may comprise two segmental longitudinal parts for forming a sealing plug which can be received in the space. The longitudinal parts are each provided with an outside which comprises a number of outer ribs spaced apart in a longitudinal direction for realizing, in use, annular contact surfaces which are each closed in itself in a circumferential direction between the sealing plug and the inner wall of the opening. Each of the longitudinal parts is further provided on the inside with a number of inner ribs for realizing, in use, annular contact surfaces which are each closed in itself in a circumferential direction between the sealing plug and the pipe, cable or duct extending through the opening. Each of the longitudinal parts is further provided with an outer collar intended to be placed against an outer edge of the opening. When the plug is assembled these collars are part of a flange which is such that forces can be exerted onto the flange for inserting the longitudinal parts. The flange is designed such that it can be placed against the outer edge of the opening. The outer edge of the opening is thus covered by the flange. The flange further ensures equal insertion, so that the outer ribs of the longitudinal parts are lined up to form the annular contact surfaces and such that the inner ribs are lined up to form the annular contact surfaces.

An advantage of this sealing system is that it is very easy to insert, and after applying grease to the longitudinal parts, manual insertion may even be possible. A further advantage is that it is highly unlikely that the plug will be further pushed into the conduit sleeve or opening, even not when a very high pressure is applied to the flange. It has turned out that this sealing system retains its sealing integrity also when a very high pressure is applied to the side of the plug that is first inserted into the opening or conduit sleeve. Only after application of a very high pressure on that end of the plug, the plug may be forced out of the conduit sleeve or opening. Another advantage is that the ribs provide some flexibility in the sealing system, so that no retightening is needed. When the rubber relaxes, the ribs are still providing annular contact surfaces and thus a sealing remains intact. This response also applies to the unlikely occurrence of creep which would result in a smaller diameter of a plastic pipe extending through the opening or conduit sleeve. However, as indicated, the creep itself is already unlikely to occur, as the actual radial load applied to a plastic pipe extending through the conduit sleeve will, due to the relaxation of the rubber, decrease in time, so that the possible occurrence of creep will come to a slowdown rather than an acceleration.

Although the system described in WO 2004/111513 A1 works satisfactorily, there remains a need for sealing systems that can sustain a sudden increase of a pressure applied to one end of the sealing system.

It is an objective of the invention to meet this need.

It is also an objective to provide a system which is suitable for providing a sealed transit for a situation wherein one or a plurality of cables, pipes or ducts extend through the transit.

This objective of the invention is achieved by providing a system for dynamically sealing an opening through which at least one pipe, cable or duct extends by a conduit sleeve which is fittingly and sealingly fixed to a circumference of the opening or which corresponds with the opening. The system comprises of at least an elastically deformable plug which is fittingly and sealingly insertable in the conduit sleeve. The plug has two ends, an outer side and an inner side. Each end has dimensions that allow for fitting of that end in the conduit sleeve, the outer side comprises a number of outer ribs having tops spaced apart in the longitudinal direction of the plug for realizing annular contact surfaces between the plug and the inner circumferential wall of the conduit sleeve. The inner side comprises a number of inner ribs having the tops spaced apart in the longitudinal direction of the plug for realizing annular contact surfaces between the plug and the at least one pipe, cable or duct. The inner side and/or the outside is provided with at least one hingeble surface area for facilitating compression of the plug in the longitudinal direction and a transverse movement of at least one of the inner or outer ribs.

As each of the ends have dimensions that allow for fitting of that end in the conduit sleeve, the plug can in its entirety be inserted into the sleeve. When at one of the ends of the plug a very high pressure is applied, that end will initially be pressed towards the other end. The hingeable surface area will facilitate the compression of the plug in the longitudinal direction. The transverse movement of at least one of the inner or outer ribs ensures that the sealing is actually improved when the compression occurs. When a high pressure is applied on one end of the sealing plug, the sealing tightens itself thus further in the space between the inner wall of the conduit and the pipe, cable or duct that extends through the conduit sleeve. In other words, the sealing starts acting dynamically.

It is to be noted that the system does not constantly apply a very high pressure on a plastic pipe that extends via the conduit sleeve through the opening. A very high radial pressure occurs only when a high pressure is applied to one of the ends of the plug. Consequently, the occurrence of creep of the plastic pipe, is unlikely to occur to a large extent.

In an embodiment of a system according to the invention, the hingeable surface is provided by two adjacent sloped surfaces of two adjacent ribs. In such an embodiment it is facilitated that at least two ribs move in a transverse direction when the plug is being compressed in the longitudinal direction.

Furthermore, there can be a high number of ribs for a longitudinal length. It is possible that between each set of two adjacent ribs, a hingeable surface is provided. In other words, the longitudinal length of the plug is very efficiently used. This enhances the overall sealing capacity after insertion without the application of a pressure wave to one end of the plug, and even more so, when a pressure wave is applied to one end of the plug.

An embodiment of a system according to the invention further comprises a blocking element for hindering, when in use, an external pressure gradient is present between both ends of the plug, movement of the downstream end of the plug downstream the pressure gradient. This not only ensures that equal insertion can occur, leading to lining up of ribs so that the annular contact surfaces are correctly formed, it also ensures that the plug will be compressed rather than moved in its entirety in the conduit sleeve downstream the external pressure gradient. This further facilitates the improvement of the sealing capacity. Such a system may withstand a shock wave due to, for instance, a sudden sinking down in the water, an explosion, hurricane or perhaps even a tsunami. Experiments have indicated that the plug will retain its sealing integrity when the pressure difference between both ends of the plug is up to 15 bar (which is a pressure present at 150 meters below water surface).

This applies in particular for an embodiment of a system according to the invention wherein two plugs as described above are situated in the conduit sleeve and a blocking element is situated between these two plugs. In this case the system will dynamically seal independent of the direction of the external pressure gradient. In either situation, one of the plugs will be compressed, thus increasing its sealing contact surfaces and applying a higher load normal to these contact surfaces so that the sealing overall greatly improves.

Also an embodiment of a system according to the invention wherein at least two blocking elements are applied for hindering, in use, relative to the conduit simultaneous and equal movement of both ends of the plug downstream an external pressure gradient, has these advantages. Independent of the direction of the pressure gradient, the plug will always compress and improve its sealing role.

The invention further relates to a transit system comprising a plug as described above and a conduit sleeve.

The invention is further related to a system for providing a sealed transit for a situation wherein one or a plurality of cables, pipes or ducts extend through the transit, wherein the system comprises a frame which is sealingly fixed or fixable into or onto an opening.

The invention is now elucidated by describing a non-limiting example with the aid of a drawing. In the drawing.

In the drawings, like parts have like references.

Figure 1:
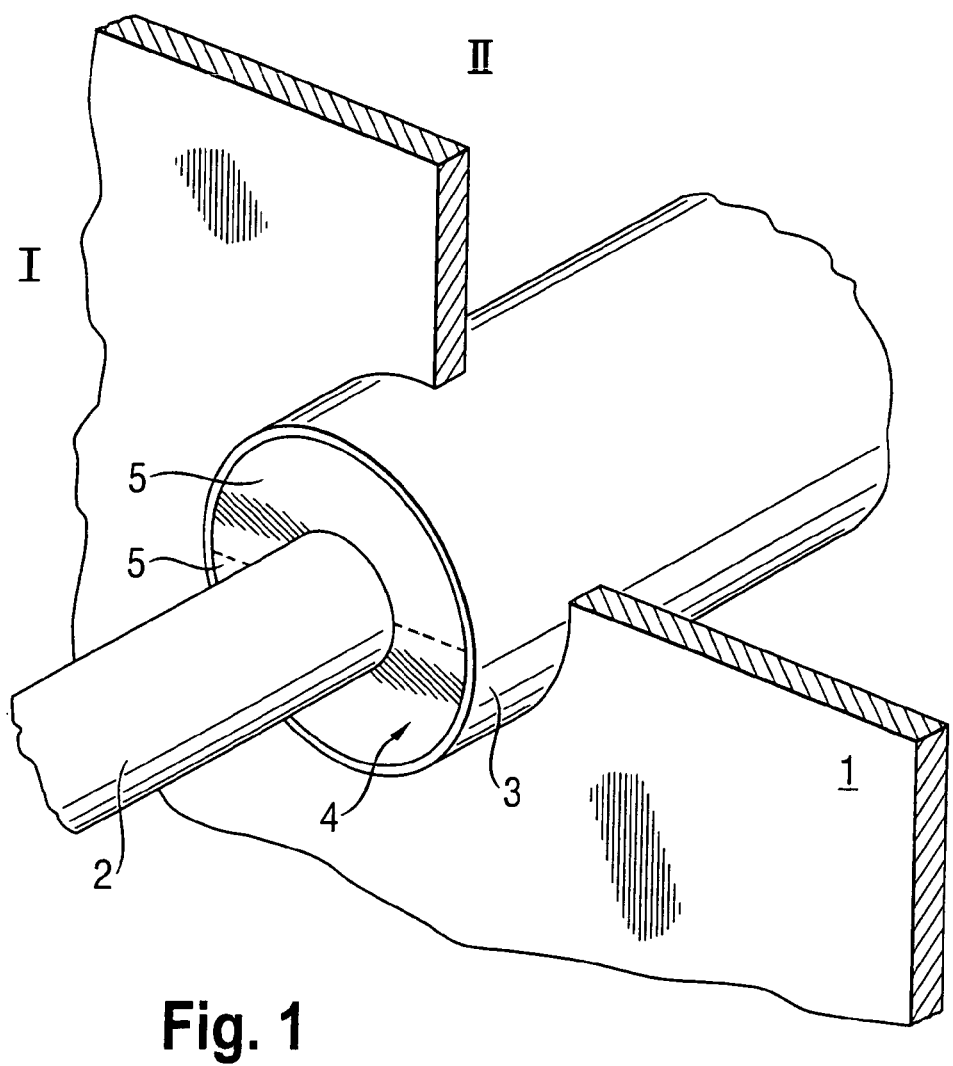
FIG. 1 shows schematically in perspective an embodiment of a system according to the invention.
Figure 2:
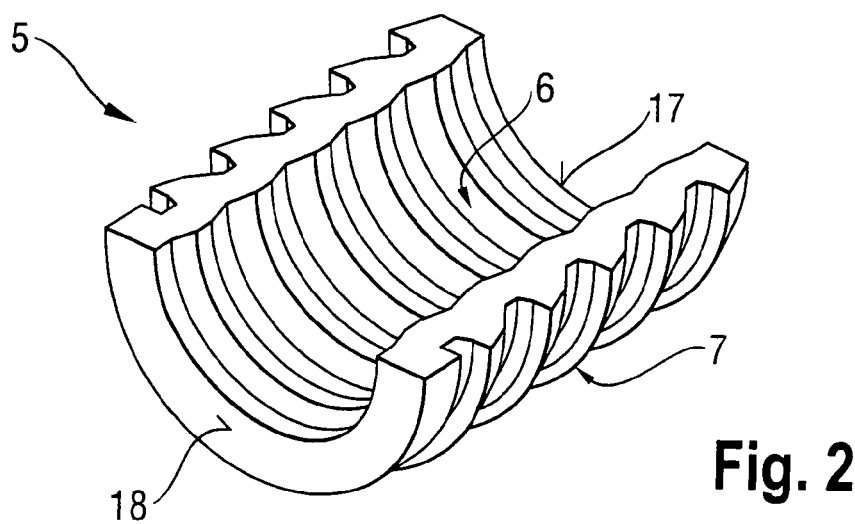
FIG. 2 shows schematically in perspective a longitudinal part of an embodiment of a system according to the invention.

FIG. 1 shows a partition 1 which is for the sake of clarity shown with a part cut out. The partition 1 divides two compartments I, II. The partition 1 comprises an opening through which a pipe 2 extends. Wherever in this specification a pipe is referred to below, the pipe may also be a duct or a cable. A conduit sleeve 3 corresponds to the opening. It is also possible to consider the conduit sleeve 3 as fittingly and sealingly fixed to a circumference of the opening. In general, the conduit sleeve is an example of a conduit which is suitable for receiving one or more cables, pipes or ducts. Such a conduit is further suitable for receiving an elastically deformable plug for sealingly filling space between an inner circumferential wall of the conduit and the number of pipes, cables or ducts extending therethrough. The system may in an embodiment comprise such an elastically deformable plug 4 which is fittingly and sealingly insertable in the conduit sleeve 3 as shown in FIG. 1. The partition wall 1 may be a steel wall. The conduit sleeve 3 may also be made of steel and may in fact comprise a steel tube. The steel tube may be welded into the opening of the partition 1. The plug 4 may comprise a single piece as suitable for situations where the plug 4 can be inserted into the conduit sleeve 3 before the pipe 2 extends through the conduit sleeve 3. However, as most often the plug 4 will be an assembly of at least two segmental longitudinal parts 5. In that case, the plug 4 can also be formed and inserted when a pipe 2 extends through the conduit sleeve 3, before insertion of the plug 4. The division between these two segmental longitudinal parts 5 of plug 4 in FIG. 1 is shown by a dashed line. A perspective view of one longitudinal part 5 of the plug 4 is shown in FIG. 2.

Figure 3:
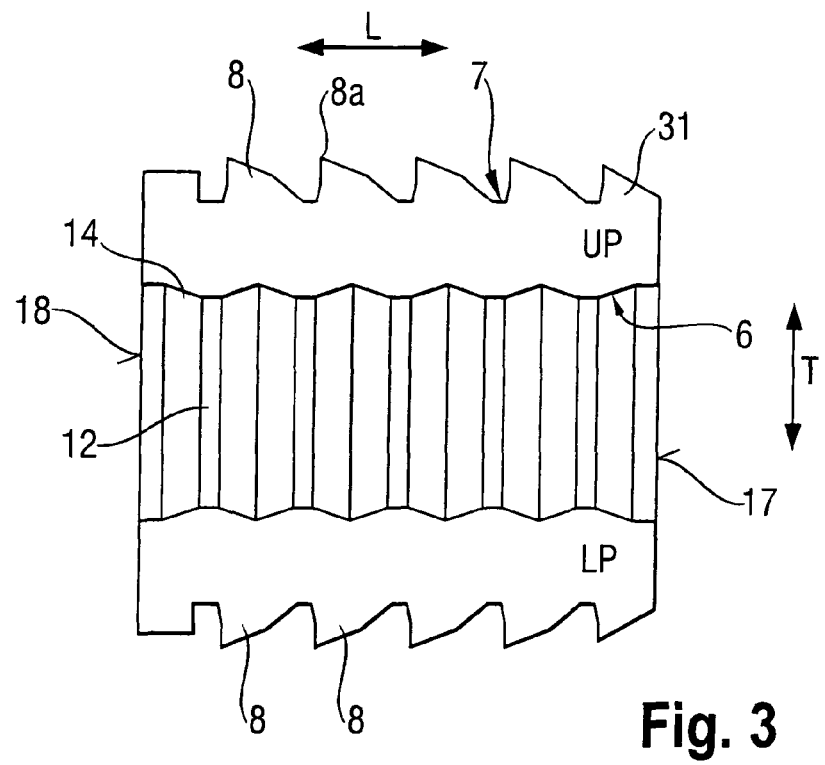
FIG. 3 shows schematically a view on a longitudinal part of a system according to an embodiment of the invention.

FIG. 3 shows schematically a view of an inner side 6 of a longitudinal part 5 of a system according to an embodiment of the invention. Two of such longitudinal parts 5 can together form a plug 4. The upper part UP and the lower part LP of FIG. 3 correspond to a cross-section along a longitudinal direction L of a longitudinal part 5. The cross-section shown in the upper part UP of FIG. 3 is shown enlarged in FIG. 4. The longitudinal segmental part 5 is provided with an outer side 7. This outer side 7 comprises a number of outer ribs 8 having tops 8a spaced apart in the longitudinal direction of the plug 4 for realizing annular contact surfaces 9 (see FIG. 5) between the plug 5 and an inner circumferential wall 10 of the conduit sleeve 3. The inner side 6 is comprised of a number of inner ribs 11 having tops 11a spaced apart in a longitudinal direction of the plug 4 for realizing annular contact surfaces 12 between the plug 4 and the pipe 2. The term "spaced apart" encompasses a situation in which ribs have a part that is unconnected to the neighboring rib. However, "spaced apart" does not exclude a situation in which the ribs are adjacent each other.

In this exemplary embodiment, the inner side 6 is provided with a number of hingeable surface areas 15 for facilitating compression of the plug 4 in the longitudinal direction L and a transverse movement of at least one of the inner 11 and/or outer ribs 8. This hingeable surface area 15 is in FIG. 4 indicated by a circle represented by a dashed line. In this embodiment, the hingeable surface area 15 is provided by two adjacent sloped surfaces 14 of two adjacent inner ribs 11. In this example the hingeable surface area 15 is provided on the inner side 6. It can be seen that the inner side is provided with four hingeable surface areas 15. It is of course also possible that the inner side 6 is provided with only one hingeable surface area 15. However, the more hingeable surface areas 15 are provided, the more compression of the plug 4 in the longitudinal direction is facilitated.

Furthermore, the more hingeable surface areas are provided by two adjacent sloped surfaces 14 of two adjacent inner ribs 11, the larger the number of inner ribs 11 that experience facilitation of a transverse movement. How the hingeable surface areas 15 result in the possibility of sealing dynamically is explained later. At this stage it is pointed out that although the hingeable surface areas 15 are in this example shown to be provided on the inner side 6, one or more hingeable surface areas may also, or alternatively, be provided on the outer side 7.

At this stage the longitudinal segmental parts 5 are described in more detail. Each inner rib 11 has preferably the shape of a trapezium. Each of the inner ribs 11 is provided with an abutting surface 13 that extends in the longitudinal direction L and that, in use, abuts the pipe 2. Each inner rib 11 is on either side of the abutting surface 13 provided with a sloped surface 14 which extends away from the abutting surface 13. The slope of each sloped surface 14 encloses an angle γ, with a transverse direction T of the segmental longitudinal part 5 such that bending of each inner rib 11 is substantially inhibited when the segmental longitudinal part 5 is inserted. The insertion will be described later. One could also say that due to the shape of the inner rib 11 and the size of angle γ the inner ribs slide easily over the pipe 2 during insertion of the plug 4.

The slope of the sloped surface 14 is substantially constant from the abutting surface 13, from which it extends up to a point P where it meets the sloped surface 14 of an adjacent inner rib 11. Although it is shown that each slope of the sloped surface 14 of one of the inner ribs 11 is substantially the same, it is also possible that the slopes vary somewhat. The slopped surfaces 14 of the two adjacent inner ribs 11 form together a V-shaped groove, i.e. the hingeable surface area. In the example shown, all slopes of all inner ribs 11 are substantially the same. The angle γ, is between 60 and 80 degrees, preferably between 65 and 77 degrees and even more preferably between 70 and 75 degrees.

One end of the plug 4 and of each longitudinal part 5 may be denoted as the distal end 17 as this end will be distal from the part of the conduit sleeve 3 at which the plug 4, or the longitudinal parts 5, are inserted. The other end of the plug 4 and of each of the longitudinal parts 5 may be denoted as the proximal end 18, as this end remains, relative to the distal end, proximal to the part of the conduit sleeve at which insertion of the plug 4 or longitudinal part 5 occurs.

The outer ribs 8 have each substantially the shape of a sawtooth 19 with a rising surface 20 rising toward the proximal end 18. It is of course possible that only one outer rib 8 has the shape of a sawtooth 19, or that some but not all outer ribs 8 have the shape of a sawtooth 19. In this example, all outer ribs 8 have the shape of a sawtooth 19. The part 21 of the rising surface 20 adjoining the top 8a of the sawtooth 19 is, with respect to a part 22 of the rising surface 20 located further from the top 8a, provided with a levelling which includes an angle α with the longitudinal direction L. The part 21 provides a pressing surface 23 that in use presses against the inner wall 10 of the conduit sleeve 3. The pressing surface 23 includes the angle α with the longitudinal direction L. This angle α is smaller than an angle β included by the surface of the part 22 of the rising surface 20 located further from the top 8a and the longitudinal direction L. The angle α is in any case larger than zero.

A meeting of the levelling part 21 and part 22 of the rising surface 20 forms an outwardly directed bend 24 located in the rising surface 20. Although, in this example, the bend 24 is formed by a meeting of straight surfaces, it is also possible that the bend is formed by a meeting of surfaces which merge more gradually with regard to the orientation of the surfaces. A falling surface 25 of the sawtooth 19 is provided with a part 26 located relatively far from the top 8a, which is designed so as to be inclined towards the proximal end 18 with respect to a part 27 of the falling surface 25 adjoining the top 8a. The part 27 of the falling surface 25 adjoining the top 8a of the sawtooth 19 includes an angle θ with a longitudinal direction L. The angle θ is larger than the angle ω which is included by the part 26 of the falling surface 25 located further from the top 8a and the longitudinal direction L.

A meeting 28 of the part 27 of the falling surface 25 adjoining the top 8a of the sawtooth 19 and the part 26 of the falling surface 25 located further from the top 8a forms an inwardly directed bend 28 located in the falling surface 25. The bend or meeting 24 is in transverse direction located further outwardly than the bend 28. The note made above for the bend formed by meeting 24 also holds for bend 28. That is, a more gradual merge from the part 27 of the falling surface 20 and the part 26 is in this specification also understood to be a bend. It is further noted that it is also possible to provide a sawtooth 19 with a bend 28 in the falling surface 25 without the rising surface 20 of the sawtooth 19 comprising a levelling.

Figure 4:
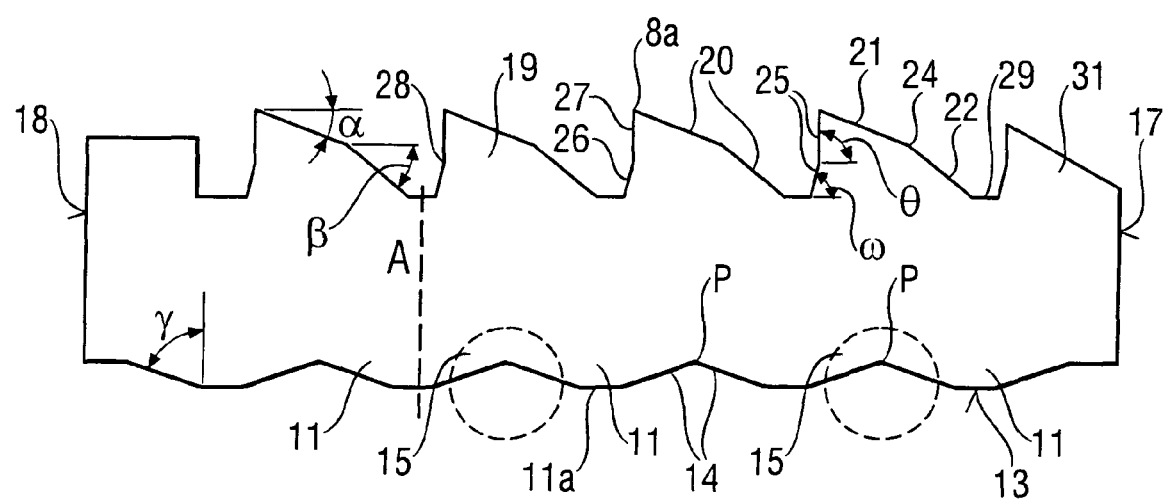
FIG. 4 shows schematically a cross-section of a longitudinal part of a system according to the embodiment shown in FIG. 3.

It is further visible in FIG. 4 that an imaginary transverse plane of the first type A intersects an outer surface 29 on the outer side 7 and an abutting surface 13 on the inner side 6. The outer surface 29 and the abutting surface 13 which both intersect the same imaginary transverse plane A, have a similar length in the longitudinal direction L. Over the entire length of the longitudinal direction of the outer surface 29 and/or the abutting surface 13, which both intersect the same imaginary transverse plane A, that outer surface 29 and that abutting surface 13 are substantially parallel to each other.

Figure 5:
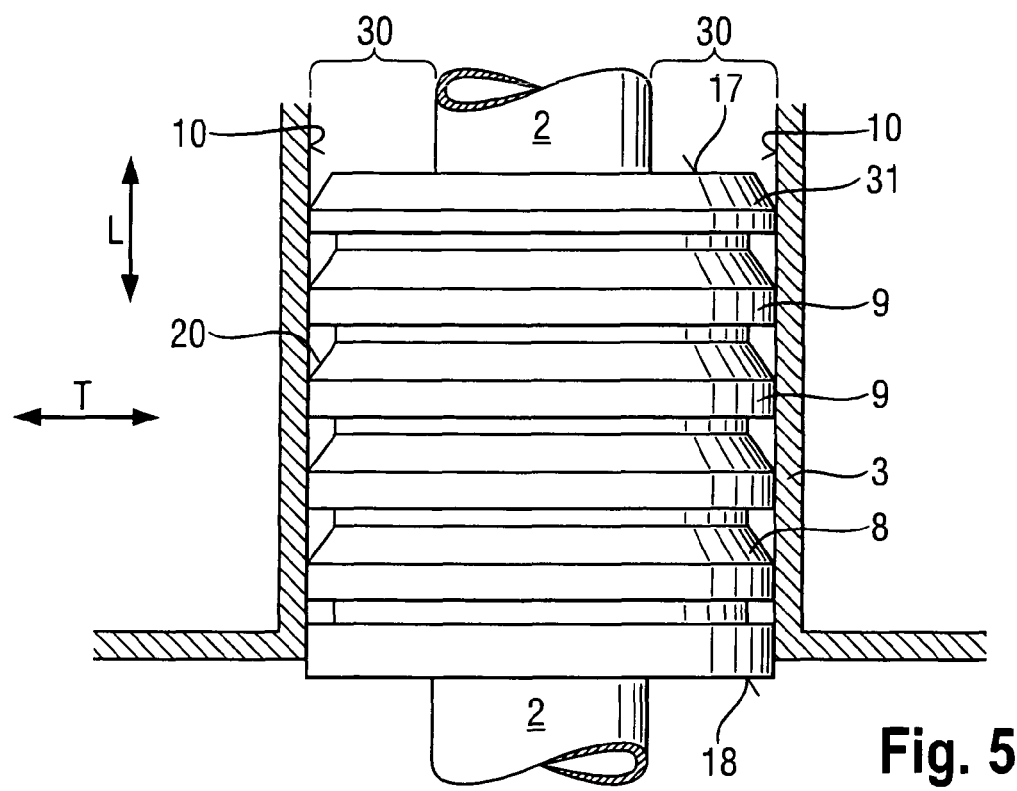
FIG. 5 shows schematically a plug as assembled by longitudinal parts according to FIG. 3 and as received in the space between an inner wall of a conduit sleeve and one pipe, cable or duct received in the conduit sleeve.
Figure 6:
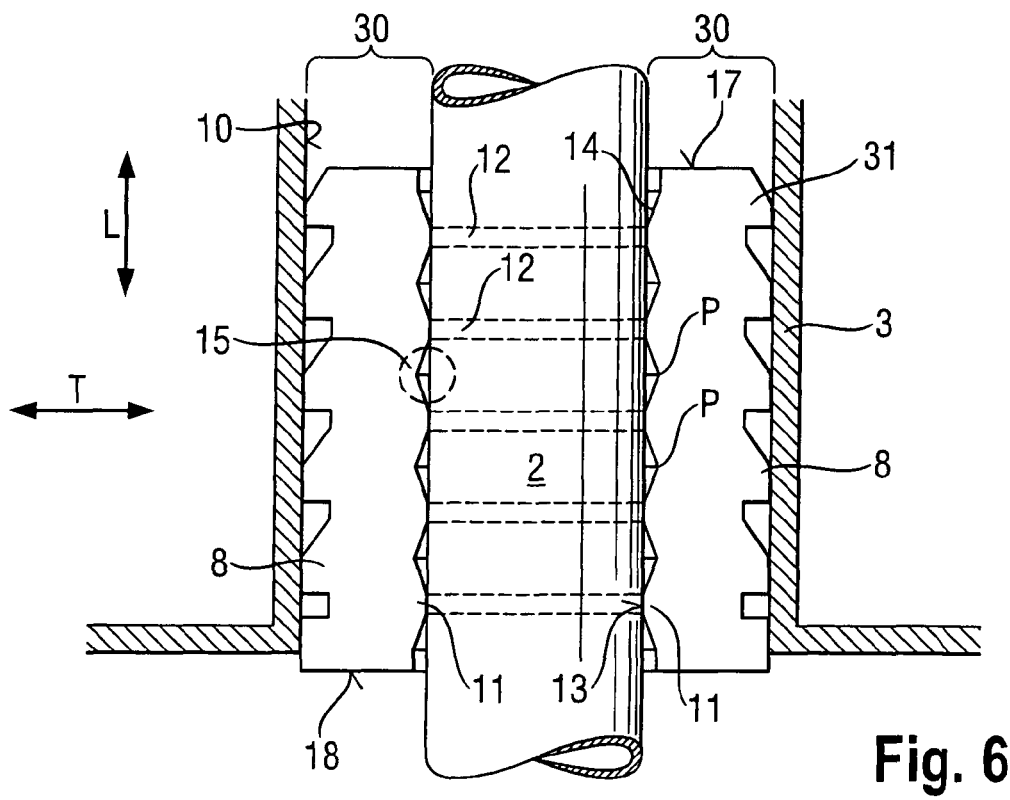
FIG. 6 shows schematically a partial cross-section of a longitudinal part according to FIG. 3 as received in the space shown in FIG. 5.

FIG. 5 and FIG. 6 show schematically in more detail how the longitudinal parts 5, and thus the plug 4, cooperate with the inner wall 10 of the conduit sleeve 3 and with the pipe 2 as received in the opening. FIG. 5 shows the inner wall 10 of the conduit sleeve 3 in cross-section, while the sealing plug 4 formed with the aid of the longitudinal parts 5 is shown in a view such as would be seen when one half of the conduit sleeve 3 would have been removed. In general, when the pipe 2 extends through the conduit sleeve 3 before insertion of the plug 4 occurs, the longitudinal parts 5 are tightly applied around the tube 2 and then, by a movement in the longitudinal direction L, forcefully pushed into the space 30 between the inner wall 10 of the conduit sleeve 3 and the pipe 2.

As towards the distal end 17, each longitudinal part 5 comprises on the outside 7 a run-in rib 31, insertion is facilitated. The run-in rib 31 extends up to an outer circumferential level that is in transverse direction less outward than an outer circumferential level up to which each other outer rib 8 extends.

Upon further pressing in the longitudinal direction L, also inner ribs 11 will contact the inner wall 10 of the conduit sleeve 3. Particularly the top 8a and at least a part of the pressing surface 23 will contact the inner wall 10. In order to overcome frictional forces occurring during the insertion, it is most often necessary to provide the longitudinal parts and/or the inner wall 10 of the conduit sleeve 3 and/or pipe 2 with a lubricant such as for instance Vaseline or soft soap. Particularly when inner wall 10 is manufactured from concrete, this provides a good solution for reducing the high frictional forces.

The plug 4, and the longitudinal parts 5 should be manually insertable. However, in some cases, it may be necessary to move the sealing plug 4 as then formed by the longitudinal parts 5 further distally in the direction L by using, for instance, a hammer. An assisting workpiece made of for instance wood, or a hard plastic, and having a shape such that it can freely be inserted into the space 30, may be helpful for placing against the proximal end 18 of the plug 4 so that the hammer can hammer instead of the plug the workpiece distally into the longitudinal direction, so that the longitudinal parts 5 of the plug 4 will not be damaged by the hammer.

It will be clear that when the plug 4 has fully been inserted into the conduit sleeve, at least a part of each pressing surface 23 will be pressing against the inner wall 10 of the conduit sleeve 3.

FIG. 6 shows the inner wall 10 of the conduit sleeve 3 in cross-section. The plug 4 as inserted is presented as viewable in the same cross-sectional plane. The annular contact surface 12 formed by the abutting surfaces 13 of the longitudinal parts 5 are shown in dashed lines. It will be clear that the plug 4 can be inserted much further distally than shown in FIGS. 5 and 6.

It will also be clear that any attempt to move the plug 4 as inserted in the conduit sleeve 3 proximally, due to for instance a high pressure applied on the distal end 17, the frictional forces at the annular contact surfaces 9 and 12, will resist such a movement. It has been found that, in some cases, a plug 4 assembled from longitudinal parts 5 will resist movement up to a pressure of 7 bar as applied to the distal end 17.

Without wishing to be bound by any theory, it is believed that the sealing system according to the invention works as follows in a dynamic fashion. The illustration of FIG. 6 might be helpful in understanding this possible working of the invention. When the proximal end 18 and distal end 17 of the plug 4, either as a one-piece plug, or as composed of longitudinal parts 5, are compressed to each other, the hingeable surface area 15 responds in the sense that the two adjacent sloped surfaces 14 of two adjacent inner ribs 11, tend to enclose a smaller angle than before the compression. The two inner ribs 11 to which the adjacent sloped surfaces 14 belong, experience a transverse inward force. The width of the annular contact surfaces 12 will as a result thereof increase. The width is a dimension of the annular contact surfaces in the longitudinal direction. This improves the sealing between the plug 4 and the surface of pipe 2. However, as pipe 2 is not giving way, the pipe 2 exerts a reaction force onto the inner ribs 11. A response of the plug 4 is that the outer ribs 8 are pushed outwardly in a transverse direction, i.e. radially outwardly in this example. As a consequence thereof, a larger surface area of the pressing surface 23 will contact the inner wall 10 of the conduit sleeve 3. In other words, the width of the annular contact surface 9 will also increase. Also in this case the width is dimension in longitudinal direction of the annular contact surfaces 9. Consequently, the sealing between the plug 4 and the inner wall 10 of the conduit sleeve 3 is also greatly improved.

It will easily be understood that when the compression of the plug 4 in the longitudinal direction L ceases, the plug 4 will tend to relax back towards its position that it had before the compression occurred. As such, the system responds dynamically upon compression of the plug in the longitudinal direction by improving the sealing integrity when the pressures exerted on the distal and proximal ends of the plug increase.

The plug remains somewhat flexible when uncompressed, allowing for vibration and shock absorption and a relatively low load applied to the pipe and inner wall of the conduit.

FIGS. 7 to 11 show further embodiments of a system according to the invention. In these embodiments the system further comprises a blocking element 37 for hindering, when in use an external pressure gradient is present between both ends of the plug, movement of the downstream end of the plug downstream the pressure gradient.

Figure 7:
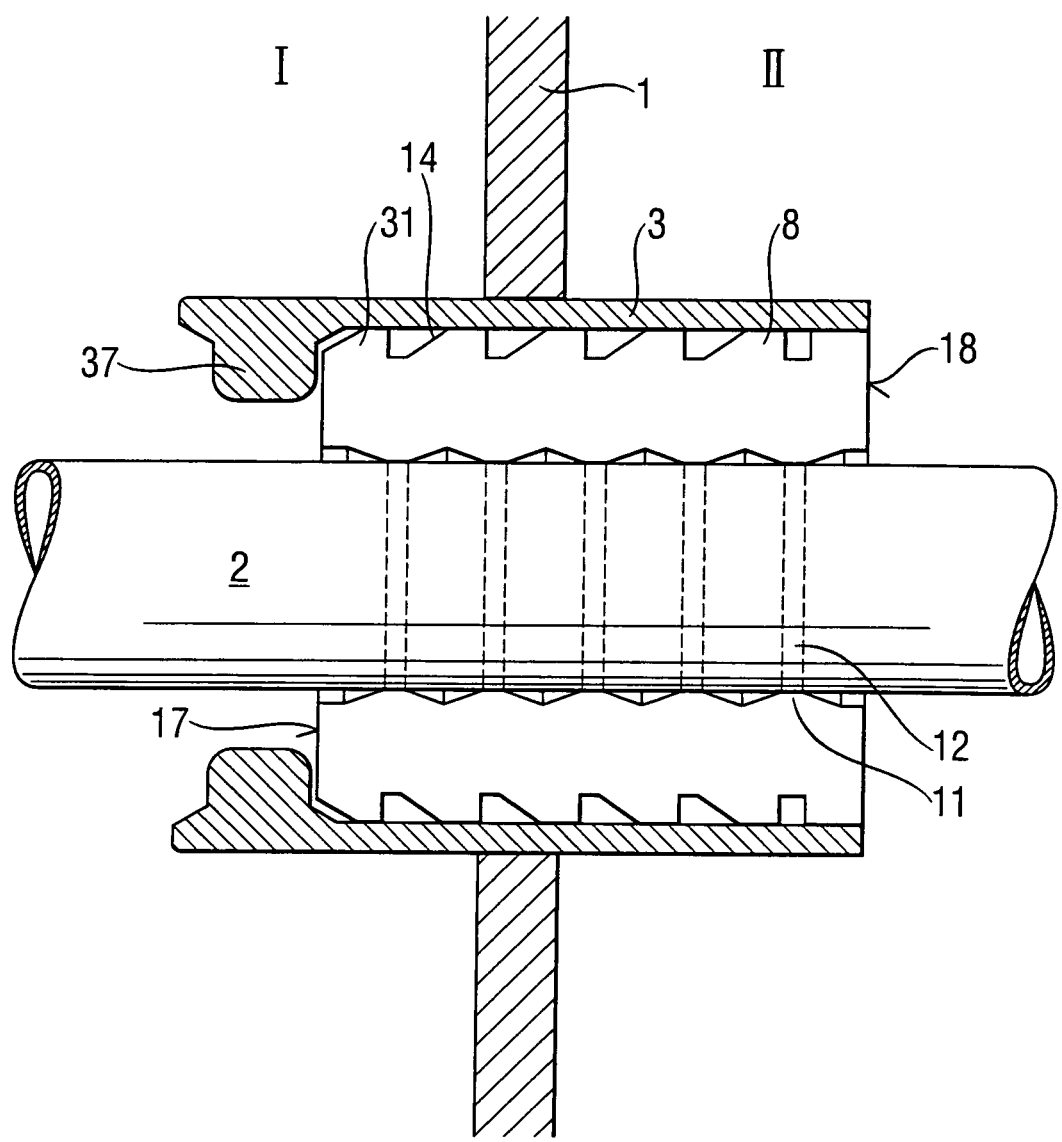
FIG. 7 shows schematically a further embodiment of a system according to the invention.

FIG. 7 shows an embodiment of a system according to the invention as suitable in a situation wherein the hazardous side of the partition 1 is known. In this situation a high pressure is expected to occur, when it occurs, in compartment II rather than in compartment I. The system comprises a blocking element 37 for hindering, when in use an external pressure gradient is present between both ends 17, 18 of the plug 4, movement of the downstream end 17 of the plug 4 downstream the pressure gradient. In other words when a very high pressure is present in compartment II and a low pressure is present in compartment I, the plug 4 will be compressed by movement of proximal end 18 towards distal end 17. When the pressure in compartment II is thus very high, the plug will compress and the annular contact surfaces 9, 12 will enhance as explained when discussing FIG. 6. In this particular embodiment blocking element 37 is fixed to the conduit sleeve 3. In fact, in this embodiment the blocking element 37 may even be considered as a part of the conduit sleeve 3. Although the blocking element 37 may be welded to the conduit sleeve 3, it is preferred that the conduit sleeve 3 and the blocking element 37 are formed by a milling process. Inner wall of the conduit sleeve 3 has preferably a surface with a low coefficient of friction. The surface may have been polished. This facilitates movement of proximal end 18 towards distal end 17 and thus compression of the plug 4 in the longitudinal direction L. In this embodiment, the blocking element 37 is substantially annularly shaped. A side of the blocking element 37 facing the distal end 17 of the plug 4, may at least partly have a shape that matches the shape of the distal end 17 and the running rib 31 of the plug 4. It is further important to note that the blocking element should not extend radially inward too much, to avoid contact with pipe 2 not only when pipe 2 has been inserted in the conduit sleeve 3 but also when the pipe 2 is being inserted in the conduit sleeve 3. To avoid any damage to pipe 2 should the pipe 2 make contact with blocking element 37, the blocking element has edges which are rounded off.

Figure 8:
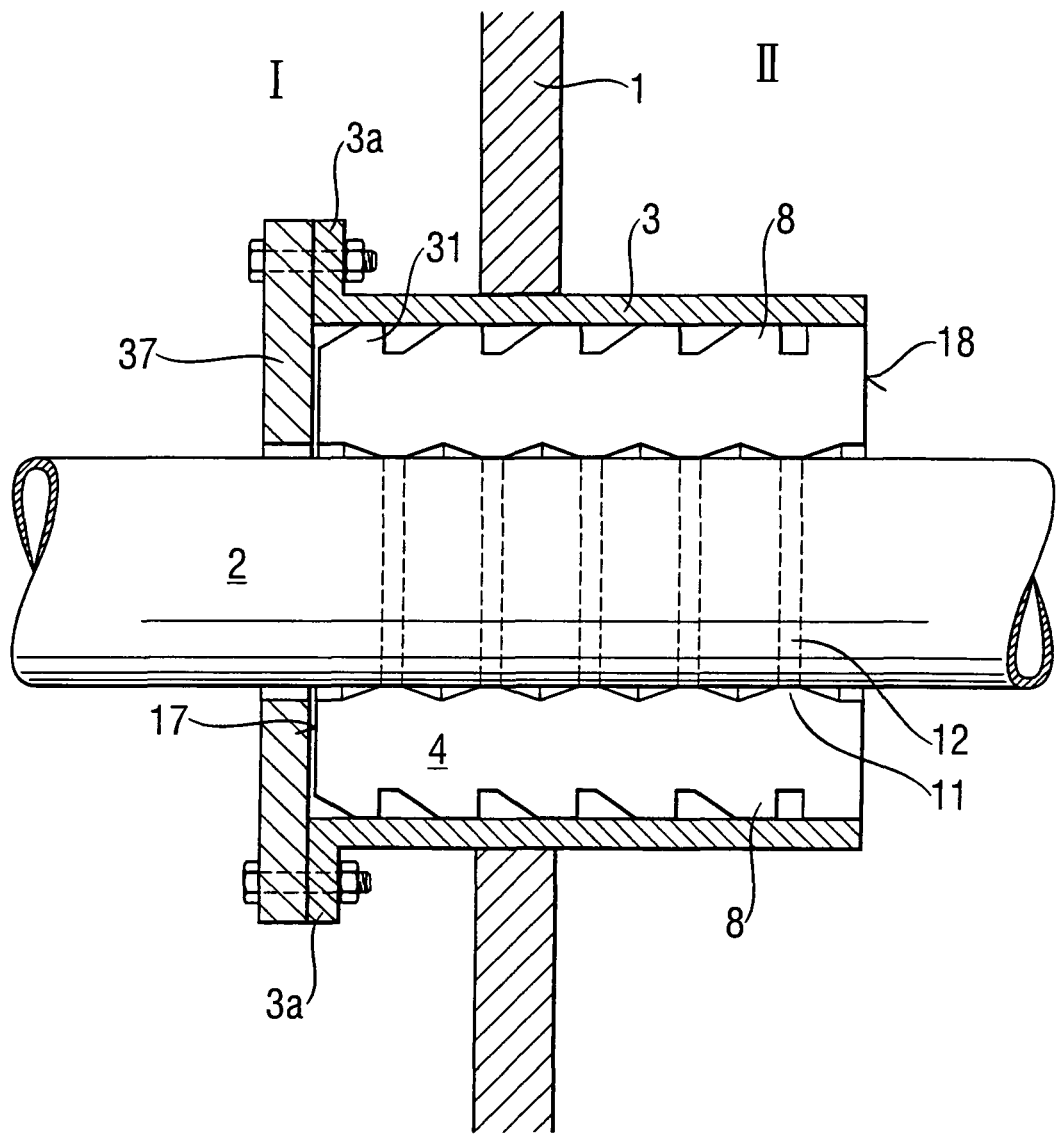
FIG. 8 shows schematically a further embodiment of a system according to the invention.

Another embodiment of a system according to the invention is shown in FIG. 8. This embodiment is also suitable for a situation wherein the hazardous side is known, i.e. the high pressure is expected to occur in compartment II rather than in compartment I. In this embodiment, the conduit sleeve 3 and the blocking element 37 are separate pieces. Conduit sleeve 3 is provided with a collar 3a that extends radially outward from an end of the conduit sleeve 3 by which in use the distal end 17 of the plug will be surrounded. The blocking element 37 may comprise two parts that form together in use an annular retainer ring. This ring can be fixed around pipe 2 and to the collar 3a of conduit sleeve 3, once the pipe has been inserted, by for instance making use of bolts and nuts and suitably aligned bore holes in respectively retainer ring 37 and collar 3a. Although it is shown that the blocking element can extend radially inward a little bit further and even very close to pipe 2, it is still preferred that a retainer ring has a much smaller radial inward length. It is also preferred that the edges of the retainer ring facing the pipe 2 are rounded off. If conduit sleeve 3 happens to be a very long conduit sleeve, i.e. much longer than the length of plug 4, it is preferred that a rubber sleeve is inserted first in the annular space between the inner wall of the conduit sleeve 3 and the pipe 2 before fixing the blocking element 37. This rubber sleeve (not shown in FIG. 8) surrounds pipe 2 and ensures that in the case of a very high pressure in compartment II as opposed to the pressure in compartment I, plug 4 does not need to move through the entire length of the conduit sleeve 3 before compression of the plug 4 occurs. Instead, but compression can start almost straight away, leading to a fast response of the dynamic sealing system. An improvement of the sealing integrity may further be in line with the mechanism as proposed when discussing FIG. 6.

Figure 9:
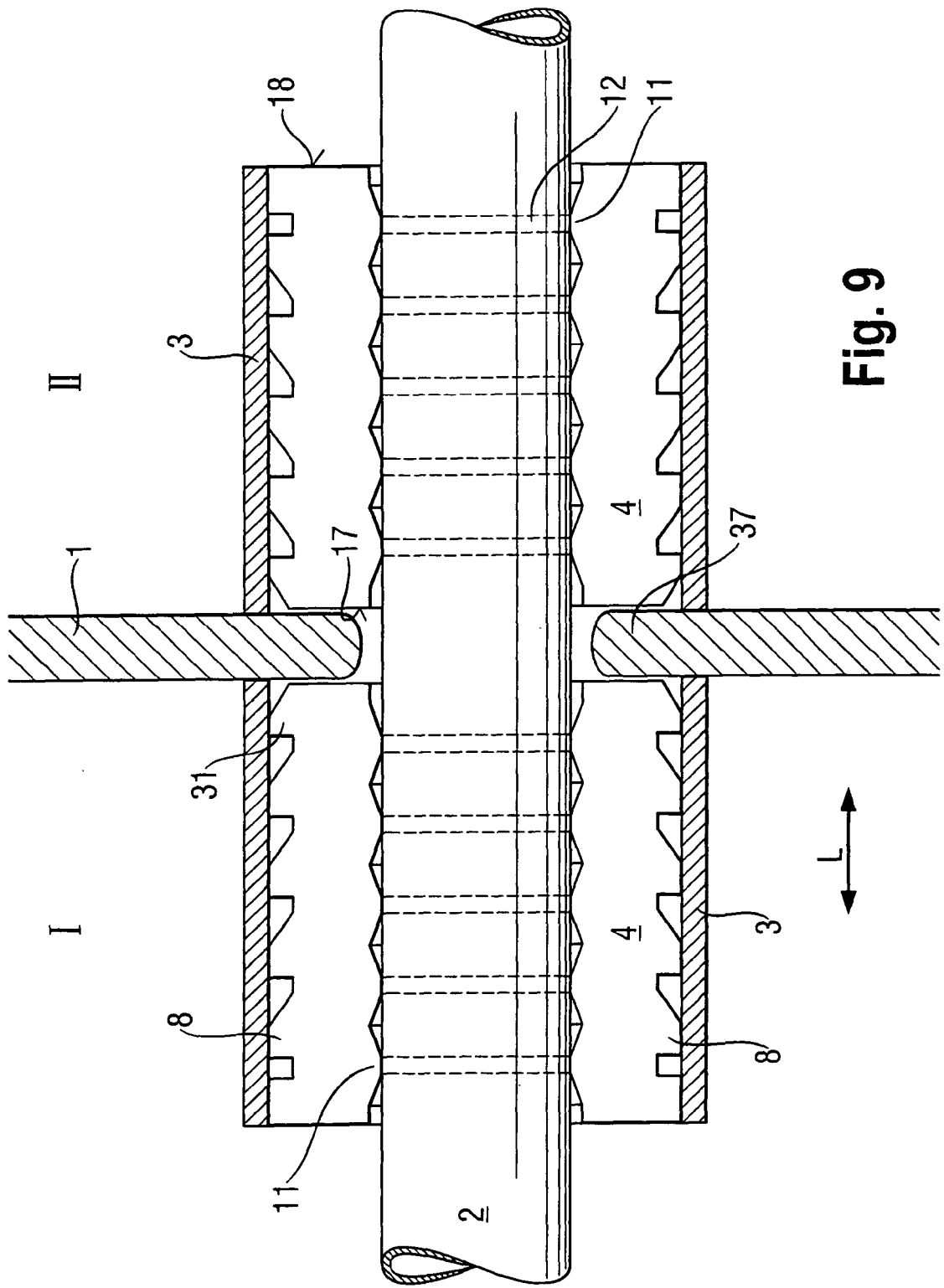
FIG. 9 shows schematically a further embodiment of a system according to the invention.

FIG. 9 shows an embodiment of the system according to the invention that is suitable for a situation wherein it is unknown from which side of the partition 1 a hazardous event may approach the conduit sleeve 3. This embodiment is particularly suitable for resisting a fire that may break out on either side of the partition 1. The system comprises two plugs 4. One of those two plugs 4 is inserted from compartment into the conduit sleeve 3 and the other one of the plugs 4 is inserted from compartment II into the conduit sleeve 3. In this embodiment, the blocking element 37 is situated between the two plugs 4. Although it is possible that the blocking element 37 is again a retainer ring that is for instance welded to an inner wall 10 of the conduit sleeve 3, it is, as shown, also possible that the opening in partition 1 is actually smaller than the diameter of the conduit sleeve 3 which is coaxially welded around a circumference of the smaller opening in the partition 1. A part of the partition 1 is then within the conduit sleeve 3 acting as a retainer ring, i.e. as a blocking element 37. Although, again the blocking element as shown extends radially inward to a rather large extent, it is preferred that the radial inward length of the blocking element is somewhat shorter.

Figure 10:
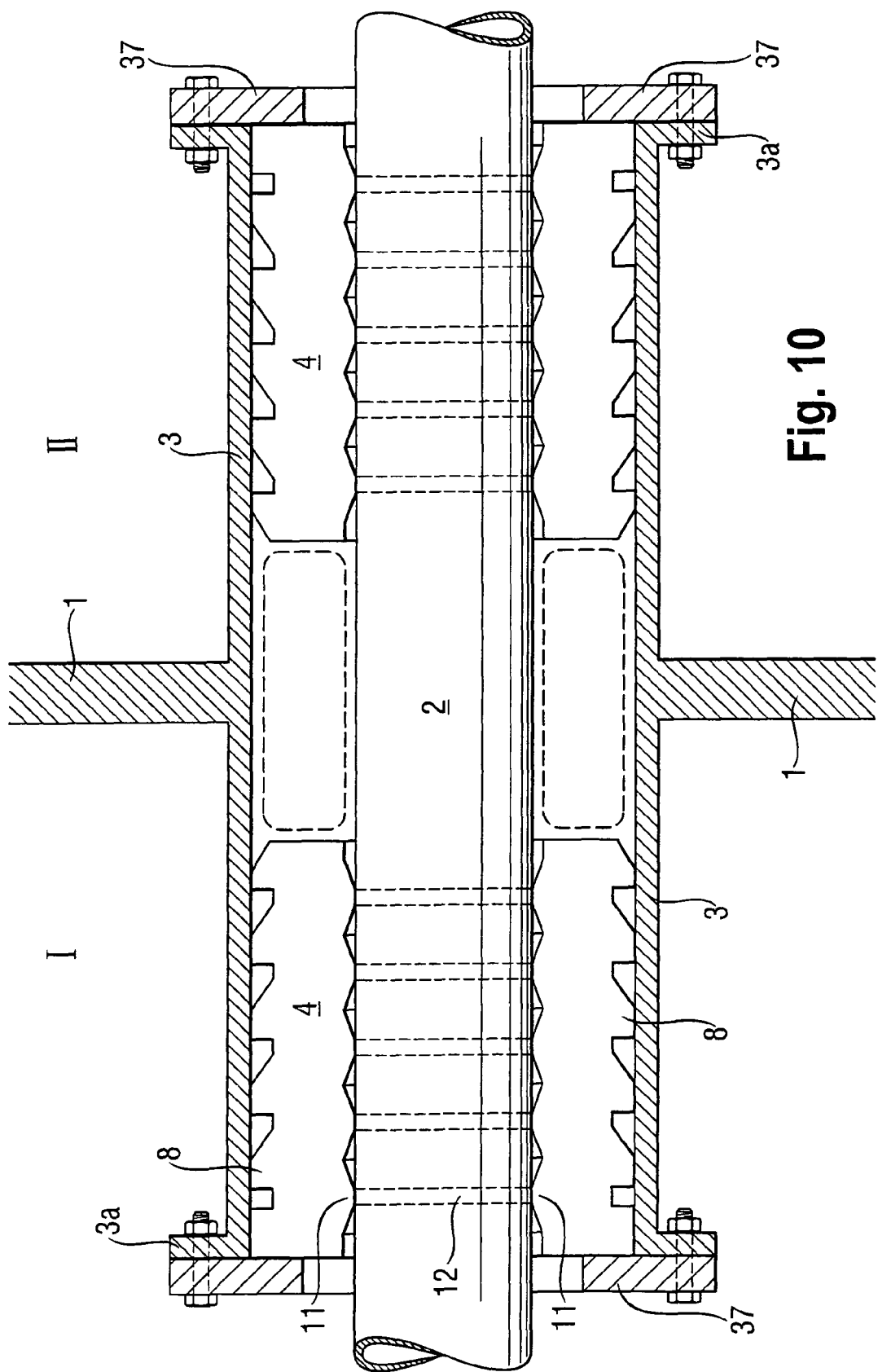
FIG. 10 shows schematically a further embodiment of a system according to the invention.

FIG. 10 shows an embodiment of a system according to the invention, that is also suitable for a situation in which one does not know from which side the hazardous event, like for instance a fire, could approach the conduit sleeve 3. The system comprises again blocking elements 37 which are, as shown, fixable to the conduit sleeve 3 in a way described when the embodiment of FIG. 8 is discussed. It is preferred that the volume of the air entrapped in the conduit sleeve between the distal end 17 of the two plugs 4, is as short as possible. This may be achieved by providing a conduit sleeve 3 having a length that is just a little bit more than the total length of two plugs 4, or by insertion of a rubber sleeve (shown in dashed line) in the conduit sleeve 3 so that the sleeve is positioned between the two plugs 4. The air gap between the plugs 4 works as thermal insulation. If as a result of thermal expansion the pressure of the air in the air gap is built up, the air gap itself may work as a blocking element, facilitating compression of the plug that experiences a high pressure on the proximal end 18. This may even occur without the thermal expansion. In particular, in situations where the volume of the air gap is small, a slight further reduction of that volume, will raise the pressure of the air trapped in the gap. The gap may then act as a blocking element.

Figure 11:
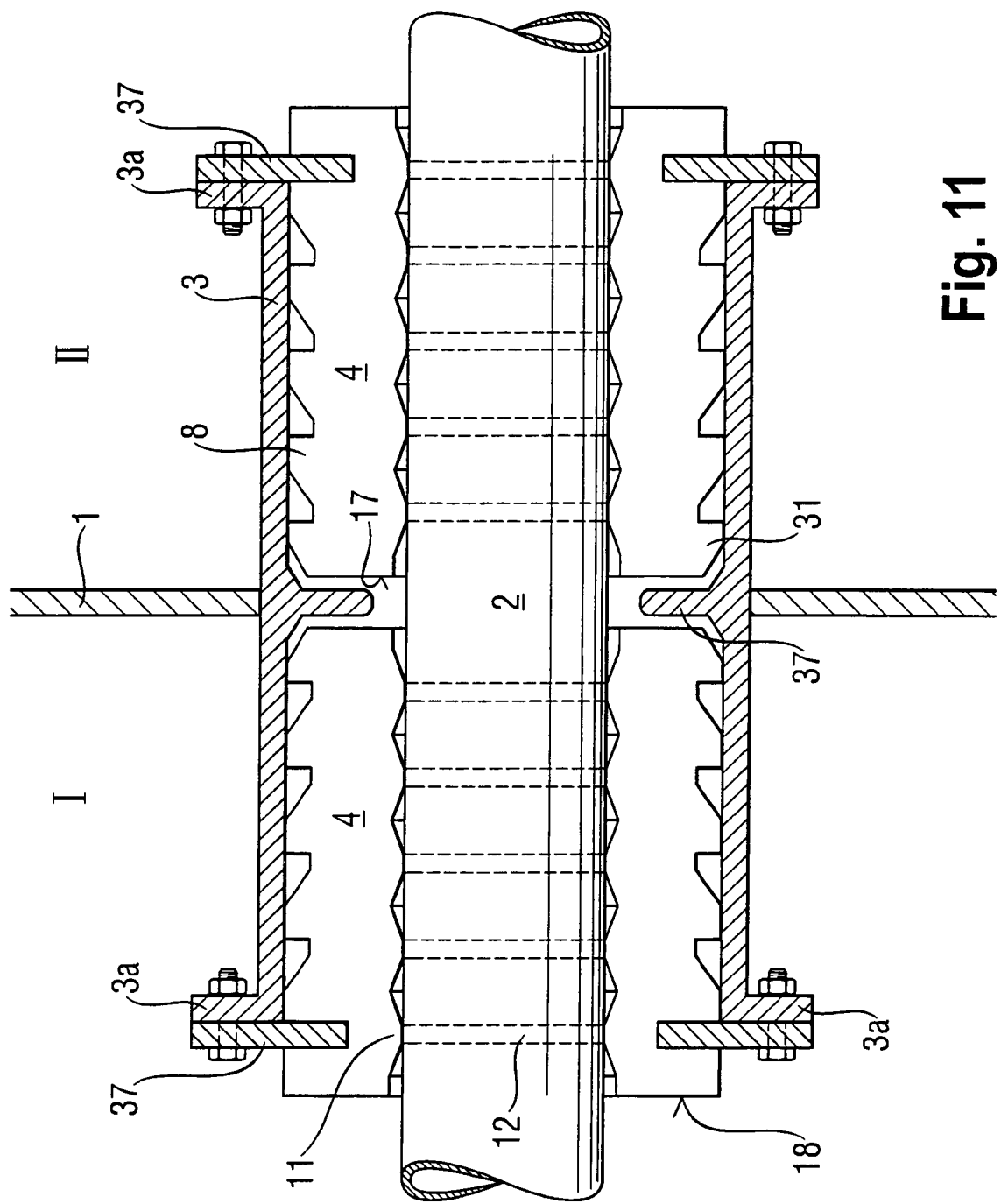
FIG. 11 shows schematically a further embodiment of a system according to the invention.

Finally, FIG. 11 shows an embodiment of a system according to the invention, wherein the conduit sleeve itself is rather short. In this embodiment the plugs 4 are each provided with an annular slot that extends from the outer side of the plug 4 inwardly in a transverse direction. This slope is provided between the outer rib that is closest to the proximal end 18 of the plug 4 and the proximal end 18 itself. After insertion of the plug 4 this annular slot can as shown receive the blocking element 37 which is further fixable to the collar 3a of conduit sleeve 3, as described when discussing the embodiment shown in FIG. 8.

It will be clear that a blocking element 37 that is fixable to the conduit sleeve is preferably a multiple part element or at least an element that can surround a pipe without the need for sliding the blocking element over the pipe at one of the ends of the pipe.

A further blocking element 37 may be provided between plugs 4 as shown, but this is not necessary.

When an explosion occurs in compartment II, the embodiment shown in FIG. 9, FIG. 10 and FIG. 11 will ensure that at least the plug present in the conduit sleeve and extending or facing the compartment I, will remain in the conduit sleeve 3 when the complete partition is moved into the direction of compartment I along the longitudinal direction L. The embodiment shown in FIG. 10 and FIG. 11 will hold both the plugs 4 independent of the direction into which partition 1 is blasted along the longitudinal direction L. A particular advantage is that there is not only a dynamic response of the sealing system available, but also that in a situation wherein the entire partition is moved in a longitudinal direction L due to for instance an explosion, the conduit sleeve 3 including the plugs 4 will equally move up with partition 1 during that movement.

Elastic material employed for the production of the segmental longitudinal parts 5, i.e. for the plug 4, is preferably of a fire resistant quality. The rubber may be designed such that it expands upon exposure to elevated temperatures. It is also possible to use silicon rubber. A suitable EPDM may also be employed. The hardness may, for instance, be 70 Shore A. Any rubber with sufficient flexibility and a compression set similar to the compression set of EPDM is suitable. Also electrically conductive rubber is among the possibilities. During the manufacture of the longitudinal parts, use will usually be made of a mold suitable for this purpose. Such a production process is known per se. For instance, injection molding or compression molding may be used. The blocking element may be of metal, but in cases where the blocking element is fixable to the conduit sleeve 3 these may also be made of a hard plastic, such as for instance polyetherimide (PEI) or, alternatively, polyethersulfonamide (PES).

The invention is not limited to the embodiment shown above. It is for instance possible that the plugs are suitable for sealing a conduit sleeve through which a plurality of pipes extend. Further reference is made to WO 2004/111513, in particular the figures for plugs designed for filling space in a conduit through which more than one pipe extends.

Although, preferably, the sealing plug 4 has a substantially cylindrical design, a deviation from this shape is also among the possibilities. Thus, the system can be designed such that the system is suitable for conduit sleeves which are quadrangular and/or rectangular. Embodiments suitable for multi-angular conduit sleeves are not precluded either. Even embodiments for other non-circular, for instance, oval shaped conduit sleeves, are among the possibilities. The same holds true for the suitability with regard to the pipes and cables and ducts to be fed through the conduit sleeve. The system can be designed such that, in use, pipes and the like with a cross-section deviating from a circular shape can be enclosed by the plug. If desired, the skilled person will be able to adjust the dimensions to the required circumstances.

The way the blocking element is fixed or fixable to the conduit sleeve can be according to many different mechanisms.

The blocking element may be fixed at the conduit sleeve by welding. However, the blocking element may also be fixed to the conduit sleeve by being integrally connected, or as a result of being machined out of one simple piece of metal, or being moulded in one single mould. The blocking element 37 may be fixable by for instance a mechanical connection, using for example one or more screws, or a latch mechanism, all well known in the art.

According to one aspect of the invention a sealed transit is provided for a situation wherein one or a plurality of cables, pipes or ducts extend through the transit. In an embodiment, the system comprises a frame which is sealingly fixed (not shown) or fixable into or onto an opening. It will later be explained how such a frame can be fixed into or onto an opening. The frame comprises basically a conduit 3 The FIG. 1 and FIGS. 5-11 show, as discussed above, only embodiments which comprise as a conduit 3 a single conduit sleeve 3. Those figures also show a frame. However, the frame shown in those figures comprise each only one conduit sleeve 3. Hence, each of those frames comprise a single conduit.

Each conduit shown in the drawings of this specification is suitable for receiving at least one of a plurality of cables, pipes or ducts 2. Each conduit is further suitable for receiving the elastically deformable plug 4 for sealingly filling the space 30 between the inner circumferential wall 10 of the conduit and the cables, pipes or ducts 2 extending through that conduit. The systems shown in the FIGS. 1 and 5-11 comprise at least one blocking element 37 for hindering in each conduit 3 movement of one end of a plug 4 which is inserted in that conduit 3.

The blocking element 37 is fixed to the frame. In fact, in the embodiment shown in FIGS. 12 and 13, each blocking element 37 is integrally connected to the frame. The blocking elements 37 are each fixed within one of the conduits 3. The embodiment shown in FIG. 7 can be fabricated by machining the conduit 3 in a single block of material. The decrease of diameter of the conduit 3 provides the blocking element 37. The blocking element 37 and conduit 3 shown in FIG. 9 may be integrally connected as a result of welding conduits 3 against the partition 1 around an opening in partition 1. The blocking element 37 inside the conduit 3 as shown in FIG. 11 may be integrally connected as a result of a machining process whereby out of a single piece of metal the conduit 3 and that blocking element 37 are formed. The inner circumferential wall 10 of each conduit sleeve 3 has preferably a surface with a low coefficient of friction formed by, for instance, a suitable milling process. This facilitates insertion of the plug 4 and accelerates the response of the plug 4, as described earlier, upon a sudden high pressure exerted on the proximal end of the plug 4.

The block of material out of which such a frame comprising a conduit is machined, is preferably of steel or aluminium. This allows for welding of the frame to a similar counter material of which, for instance, a partition is made. The frame may be provided with a flange (not shown) for welding the frame to a steel or aluminium construction element (not shown). Such a flange may provide a buffer zone for accommodating thermal stresses occurring during or after welding, thereby avoiding excessive alteration of dimensions of the conduit 3. However, it is also possible that such a buffer zone is provided by providing the blocking element 37 at a relatively long distance from the position of the frame that would be affected by the welding procedure. The buffer zone may, of course, also be provided by the blocking element 37 itself.

A flange may also be suitable in cases where the frame is preferably bolted to a part of a partition that surrounds an opening. A flange is further suitable for openings which have dimensions which cannot be covered by the frame without the flange. When bolting is applied a sealing gasket will be used, as known in the art.

The system may comprise an elastically deformable plug 4 as fittingly and sealingly insertable in the conduit sleeve 3. Preferably, the conduit 3 has a length suitable for receiving a plug 4 in its entirety. As shown in FIGS. 9, 10, and 11 each conduit may have a length which is suitable for receiving two plugs 4 neighbouring each other in axial, say longitudinal, directions.

If the conduit 3 is suitable for receiving a plug in its entirety, the proximal end of the plug may be flush with a front side of the frame. Suitable plugs 4 may be as described earlier on in the specification.

Figure 12:
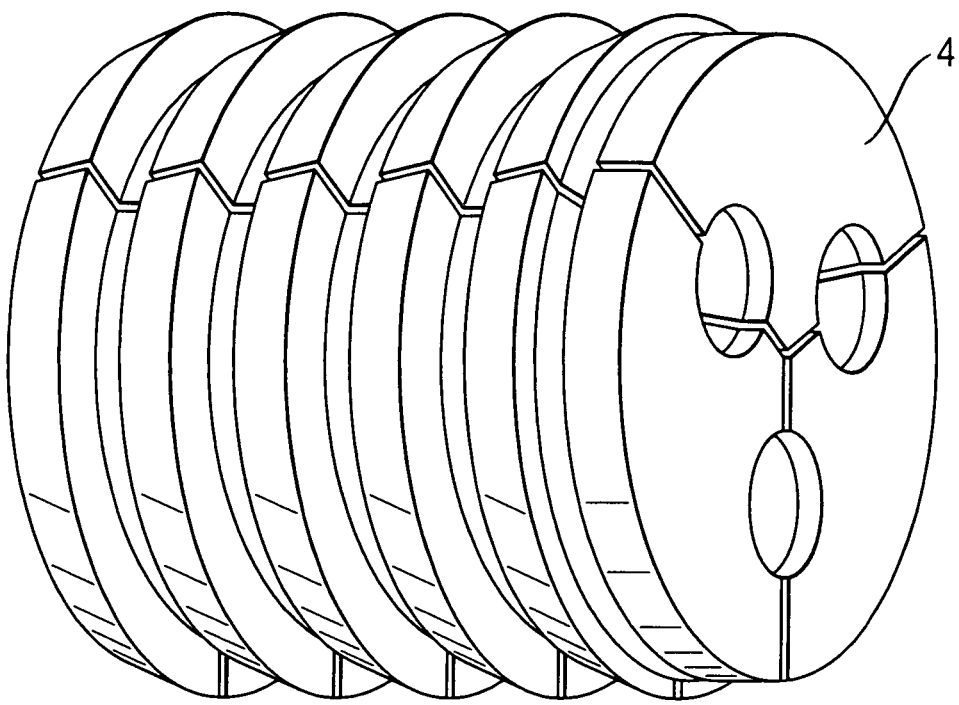
FIG. 12 shows schematically in perspective a part of an embodiment of a system according to the invention.

FIG. 12 shows an example of such a plug 4 as suitable for a conduit through which three pipes, tubes or cables extend.

Figure 13:
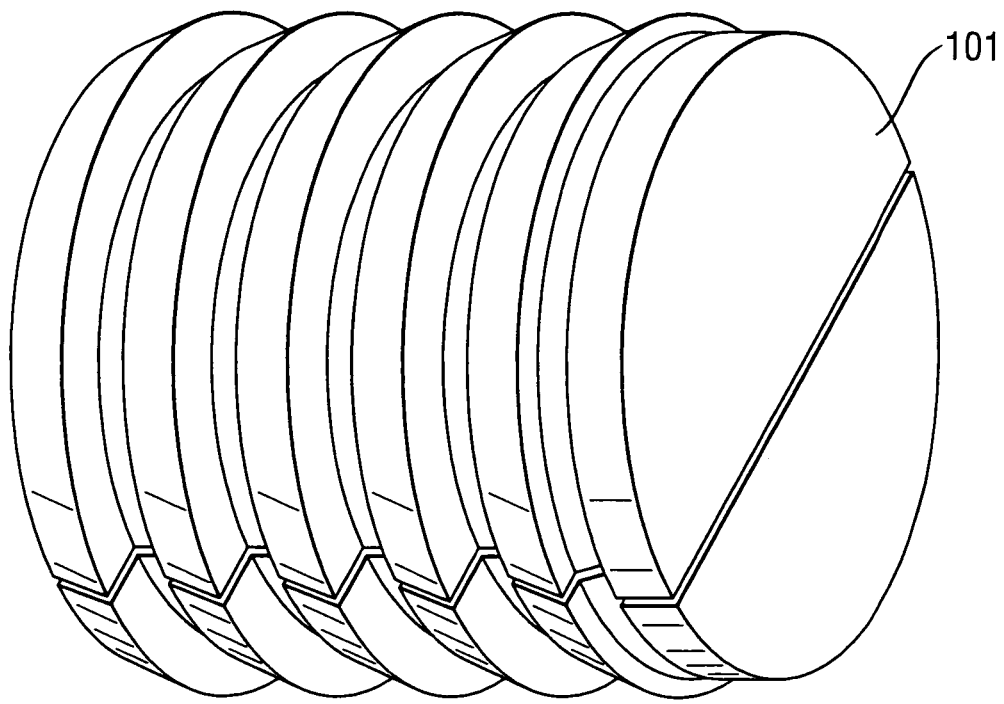
FIG. 13 shows schematically in perspective a part of an embodiment of a system according to the invention.

FIG. 13 shows a so-called blind plug 101. Such a plug can be inserted temporarily for a period during which no pipe, tube or cable or duct extends through the conduit.

Finally, as mentioned before, the frame may indeed be made of a metal, but may alternatively be made of a engineering plastic such as a hard plastic comprising polyetheremide (PEI) or, alternatively, polyethersulfonamide (PES). Such frames may be employable in, for instance, on-shore constructions and be placed in or onto openings in a concrete wall, with the aid of a suitable sealing kit, well-known in the art. Also an embodiment with a flange may be of an engineering plastic. In that case the flange will be made suitable by bolding the frame, preferably using a gasket, to the partitioning construction element.

All such variations are understood to fall within the scope of the invention as defined by the appended claims.

The invention claimed is:

1. A system for dynamically sealing an opening through which at least one pipe, cable or duct extends via a conduit sleeve extending through the opening and which is fittingly and sealingly fixed to a circumference of the opening or which corresponds to the opening, wherein the system comprises at least an elastically deformable plug which is fittingly and sealingly insertable in the conduit sleeve, the plug having two ends, an outer side and an inner side, each end having dimensions that allow for fitting of that end in the conduit sleeve, the outer side comprising a number of outer ribs having tops spaced apart in a longitudinal direction of the plug for realizing annular contact surfaces between the plug and an inner circumferential wall of the conduit sleeve, the inner side comprising a number of inner ribs having tops spaced apart in the longitudinal direction of the plug for realizing annular contact surfaces between the plug and the at least one pipe, cable or duct, wherein the inner side and/or the outer side is provided with at least one hingeable surface area for facilitating compression of the plug in the longitudinal direction and a transverse movement of at least one of the inner or outer ribs, wherein the system further comprises a blocking element for hindering, when in use an external pressure gradient is present between both ends of the plug, movement of a downstream end of the plug downstream the pressure gradient, and wherein:

the blocking element and the conduit sleeve comprise together a single piece, an inner diameter of the blocking element is larger than an outer diameter of the pipe, cable or duct, and the hingeable surface area is provided by two adjacent sloped surfaces of two adjacent ribs that form together a V-shaped groove.

2. A system according to claim 1, wherein the hingeable surface is provided on the inner side.

3. A system according to claim 1, wherein the plug is an assembly of at least two segmental longitudinal parts.

4. A system according to claim 1, wherein the system comprises the conduit sleeve.

5. A system according to claim 4, wherein the inner wall of the conduit sleeve is provided with a surface that has a low friction coefficient.

6. A system according to claim 1, wherein the blocking element comprises a substantially ring shaped element.

7. A system according to claim 1, wherein the system comprises two plugs which are each according to the plug as described in claim 1.

8. A system according to claim 7, wherein the two plugs are situated in the conduit sleeve and the blocking element is situated in the conduit sleeve between the two plugs.

9. A system according to claim 1, wherein the system comprises at least two blocking elements for hindering, in use, relative to the conduit simultaneous and equal movement of both ends of the plug downstream an external pressure gradient.

10. A transit system comprising a conduit sleeve through which at least one pipe, cable or duct extends such that a longitudinal direction of the conduit sleeve and a longitudinal direction of the at least one tube or duct are substantially parallel to each other, wherein the system further comprises at least an elastically deformable plug which is fittingly and sealingly insertable in the conduit sleeve, the plug having two ends, an outer side and an inner side, each end having dimensions that allow for fitting of that end in the conduit sleeve, the outer side comprising a number of outer ribs having tops spaced apart in a longitudinal direction of the plug for realizing annular contact surfaces between the plug and an inner circumferential wall of the conduit sleeve, the inner side comprising a number of inner ribs having tops spaced apart in the longitudinal direction of the plug for realizing annular contact surfaces between the plug and the at least one pipe, cable or duct, wherein the inner side and/or the outer side is provided with at least one hingeable surface area for facilitating compression of the plug in the longitudinal direction and a transverse movement of at least one of the inner or outer ribs, wherein the system further comprises a blocking element for hindering, when in use an external pressure gradient is present between both ends of the plug, movement of a downstream end of the plug downstream the pressure gradient, and wherein:
the blocking element and the conduit sleeve comprise together a single piece,
an inner diameter of the blocking element is larger than an outer diameter of the pipe, cable or duct, and
the hingeable surface area is provided by two adjacent sloped surfaces of two adjacent ribs that form together a V-shaped groove.

11. A transit system according to claim 10, wherein the plug is an assembly of at least two segmental longitudinal parts.

12. A transit system according to claim 10, wherein the inner wall of the conduit sleeve is provided with a surface that has a low friction coefficient.

13. A transit system according to claim 10, wherein the blocking element comprises a substantially ring shaped element.

14. A transit system according to claim 10, wherein the system comprises two plugs which are each according to the plug as described in claim 10, wherein the two plugs are situated in the conduit sleeve and the blocking element is situated in the conduit sleeve between the two plugs.

15. A transit system according to claim 10, wherein the system comprises at least two blocking elements as described in claim 10 for hindering, in use, relative to the conduit, simultaneous and equal movement of both ends of the plug downstream an external pressure gradient.

16. A system for providing a sealed transit for a situation wherein one or a plurality of cables, pipes or ducts extend through the transit, wherein the system comprises a frame which is sealingly fixed or fixable into or onto an opening, wherein the frame comprises one conduit which is suitable for receiving at least one of the plurality of cables, pipes or ducts and for receiving an elastically deformable plug for sealingly filling space between an inner circumferential wall of the conduit and the at least one of the plurality of cables, pipes or ducts, wherein the system further comprises a blocking element for hindering movement of one end of the plug which is inserted in the conduit, wherein:
the blocking element and the frame comprise together a single piece,
an inner diameter of the blocking element is larger than an outer diameter of the pipe, cable or duct, and
the system is adapted to respond dynamically to an external pressure gradient such that the plug moves in a longitudinal direction relative to the conduit downstream the pressure gradient, expands in a transverse direction in reaction to the external pressure gradient and relaxes after cessation of the external pressure gradient.

17. A system according to claim 16, wherein the blocking element is fixed within the conduit.

18. A system according to claim 16, wherein the blocking element comprises a substantially ring shaped element.

19. A system according to claim 16, wherein the conduit has an inner circumferential wall with a surface which has a low coefficient of friction.

20. A system according to claim 16, wherein the frame is of steel or aluminium.

21. A system according to claim 20, wherein the frame is provided with a flange for welding the frame to a steel or aluminium construction element or for bolting the frame to a partitioning construction element.

22. A system according to claim 20, wherein the frame is provided with a buffer zone for accommodating thermal stresses occurring during and/or after welding, thereby avoiding excessive alteration of dimensions of the conduits.

23. A system according to claim 16, wherein the frame is made of an engineering plastic.

24. A system according to claim 16, wherein the system comprises at least one additional blocking element for hindering in the conduit simultaneous and equal movement of both ends of a plug relative to the conduit sleeve in which that plug is inserted.

25. A system according to claim 16, wherein the system further comprises at least one elastically deformable plug which is fittingly and sealingly insertable in the conduit.

26. A system according to claim 16, wherein the conduit has a length which is suitable for receiving a plug in its entirety.

27. A system according to 26, wherein each conduit has a length which is suitable for receiving two plugs neighbouring each other in axial direction.

28. A system according to claim 27, wherein each conduit has a part of the at least one blocking element positioned in the conduit such that on either side of the blocking element the conduit has a length which is suitable for receiving a plug in its entirety.

29. A system according to claim 28, wherein the plug has two ends, an outer side and an inner side, each end having dimensions which allow for fitting of that end in the conduit, the outer side comprising a number of outer ribs having tops spaced apart in a longitudinal direction of the plug for realizing annular contact surfaces between the plug and the inner circumferential wall of the conduit, the inner side comprising a number of inner ribs having tops spaced apart in a longitudinal direction of the plug for realizing annular contact surfaces between the plug and the at least one cable pipe or duct extending through the conduit sleeve, wherein the inner side and/or the outer side is provided with at least one hingeable surface area for facilitating compression of the plug in the longitudinal direction and a transverse movement of at least one of the inner or outer ribs.

30. A system according to claim 29, wherein the hingeable surface is provided by two adjacent sloped surfaces of two adjacent ribs.

31. A system according to claim 29, wherein the hingeable surface is provided on the inner side.

32. A system according to claim 29, wherein the plug is an assembly of at least two segmental longitudinal parts.

33. A transit system according to claim 10, wherein the hingeable surface is provided on the inner side.

\* \* \* \* \*